May 14, 1935.     B. J. UKROPINA     2,001,042
CONCRETE PIPE CONSTRUCTION
Filed July 21, 1933     2 Sheets-Sheet 1
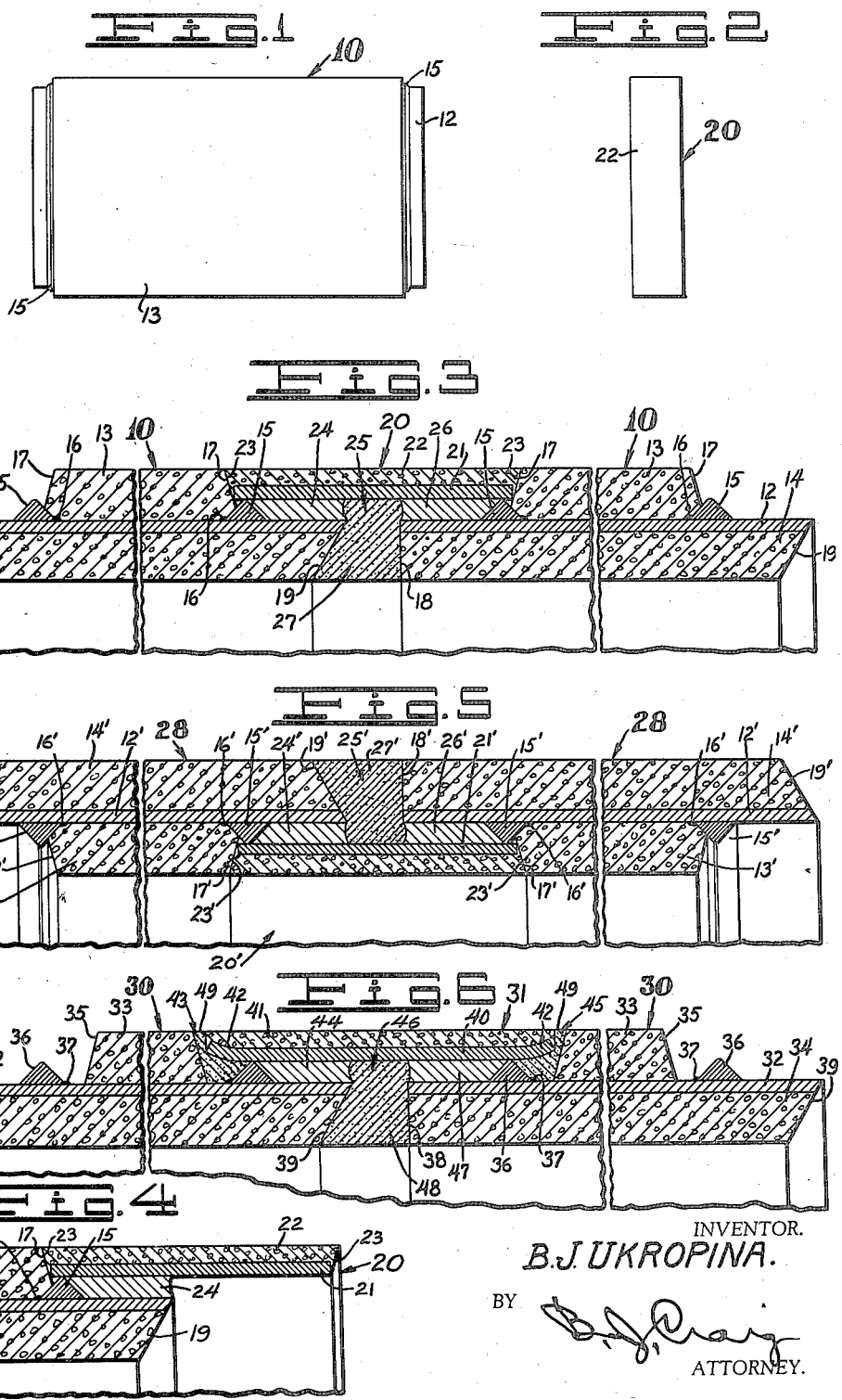
INVENTOR.
B. J. UKROPINA.
BY
ATTORNEY.

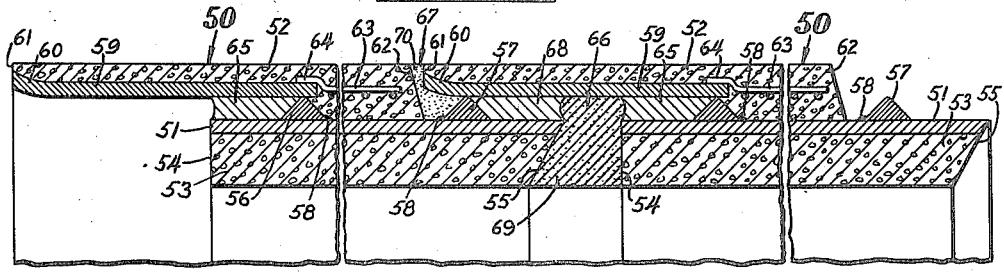
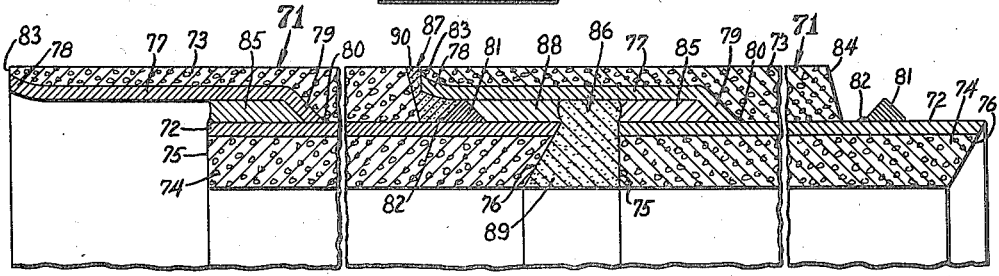
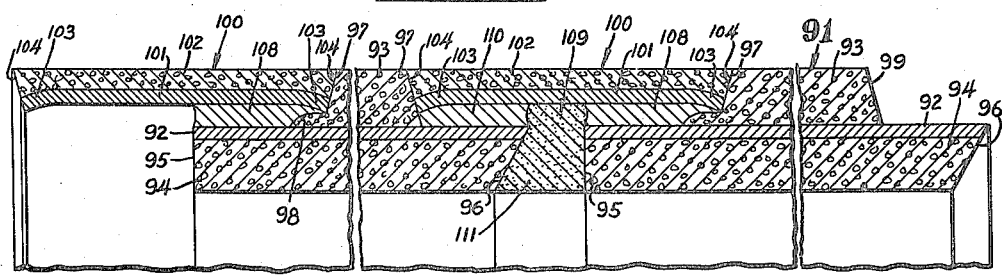
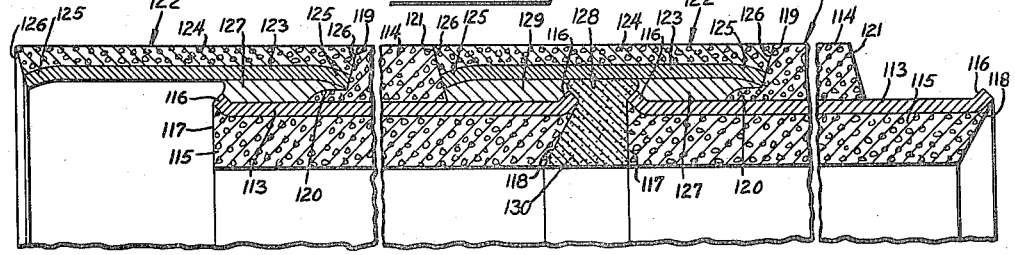

Patented May 14, 1935

2,001,042

UNITED STATES PATENT OFFICE 2,001,042

CONCRETE PIPE CONSTRUCTION

Bozidar J. Ukropina, Los Angeles, Calif.

Application July 21, 1933, Serial No. 681,552

6 Claims. (Cl. 72—53)

This invention relates to improvements in concrete pipes.

The general object of the invention is to provide an improved joint for connecting two lengths of pipe.

Another object of the invention is to provide a joint construction including novel packing means for connecting two lengths of concrete pipe.

Other objects and the advantages of this invention will be apparent from the following description taken in connection with the accompanying drawings wherein:

Fig. 1 is a side elevation of a length of concrete pipe embodying the features of my invention.

Fig. 2 is a side elevation of a collar member used in forming my improved joint;

Fig. 3 is an enlarged fragmentary section through two lengths of the pipe shown in Fig. 1 showing my improved joint construction.

Fig. 4 is a fragmentary view similar to Fig. 3 showing a collar in position on one of the pipes;

Fig. 5 is a view similar to Fig. 3 showing the pipe and collar constructed to form an inside joint instead of an outside joint as shown in Fig. 3;

Fig. 6 is a view similar to Fig. 3 showing a modified form of construction;

Fig. 7 is a fragmentary section through two lengths of concrete pipe showing a modified form of pipe and joint construction;

Fig. 8 is a view similar to Fig. 7 showing a further modified form;

Fig. 9 is a fragmentary section through two lengths of concrete pipe showing a modified form of pipe and joint construction and Fig. 10 is a view similar to Fig. 9 showing a further modified form of joint.

Referring to the drawings by reference characters, I have indicated a length of my improved concrete pipe generally at 10. As shown the pipe 10 comprises a metal reinforcing cylinder 12 embedded between an outer layer of concrete 13 and an inner layer of concrete 14. Adjacent each end of the cylinder 12 I provide a metal ring 15 which is triangular in cross section and which surrounds the cylinder 12 at a distance spaced from the adjacent end of the cylinder 12 by spot welding as indicated at 16. The outer layer of concrete 13 terminates at each end in a beveled surface 17 which intersects the inward face of the ring 15 intermediate the length thereof. At one end the inner layer of concrete 14 terminates flush with the end of the cylinder 12 as at 18 and at the opposite end both the concrete and the cylinder end are beveled as indicated at 19.

When joining two lengths of the pipe 10 I employ a collar member which I have indicated generally at 20 and have shown in elevation in Fig. 2. As shown the collar member 20 comprises a metal band 21 having a ring of concrete 22 thereon. The inner diameter of the collar 20 corresponds approximately to that of the outer diameter of the pipe rings 15 and the outer diameter of the collar preferably corresponds to the outer diameter of the pipe. Each end face of the collar 20 is beveled as at 23 to correspond to the beveled ends 17 of the pipe.

In forming a joint between two lengths of pipe 10 the collar 20 is positioned over the ring 15 at one end of the pipe with the end face 23 of the collar abutting the end face 17 of the pipe. When the collar 20 is in this position a space is left between the collar band 21 and the pipe cylinder 12 which is filled with a caulking material 24 such as lead wool (see Fig. 4). The collar 20 may be placed on the pipe and the caulking 24 placed in position at the place of manufacture if desired. The caulking material 24 is driven tightly against the ring 15 and extends to approximately flush with the adjacent end of the pipe cylinder 12.

After the collar 20 has been positioned on one pipe and the caulking material 24 placed in position one end of another length of pipe 10 is placed in the collar 20. The two lengths of pipe are positioned so that the end 18 of one faces the end 19 of the other. When the second pipe has been positioned in the collar 20 so that the face 17 of the pipe abuts the face 23 of the collar a chamber 25 is left between the adjacent ends of the two pipe lengths and a space is left between the collar band 21 and the cylinder 12 of the second pipe which is filled with a caulking material 26 such as lead wool. The caulking 26 like the caulking 24 is tightly driven against the ring 15 of the second pipe and extends to approximately flush with the end 19 of its associated pipe. After the caulking material 26 has been placed in position a filling material 27 such as cement mortar is positioned in the chamber 25.

In Fig. 5 I have indicated generally at 28 two lengths of joined concrete pipe wherein the elements of construction have been reversed to form an inside joint instead of an outside joint as shown in Fig. 3 and wherein similarly primed reference numerals indicate portions corresponding to the portions in Fig. 3.

In Fig. 6 I have indicated a slightly modified form of pipe construction generally at 30 and a collar generally at 31. As shown the pipe 30 comprises a reinforcing metal cylinder 32 embedded between an outer layer of concrete 33 and an inner layer of concrete 34. The outer layer of concrete 33 at each end is set back from the adjacent end of the cylinder 32 and terminates in a beveled face 35. Adjacent each end of the cylinder 32 I provide a triangularly shaped metal ring 36 which surrounds the cylinder intermediate the end thereof and the face 35 of the outer layer of concrete. The rings 36 are preferably secured to the cylinder 32 by spot welding them thereto as indicated at 37. The inner layer of concrete 34 at one end terminates in a plane face flush with the adjacent end of the cylinder as at 38 and at the opposite end both the concrete and the cylinder end are preferably beveled as at 39.

As shown the collar 31 comprises a metal band 40 having a ring of concrete 41 thereon. The opposite ends of the band 40 are curved outwardly as indicated at 42 and the ends of the concrete terminate flush therewith. The inner diameter of the collar 31 corresponds approximately to the outer diameter of the pipe rings 37 and the outer diameter of the collar preferably corresponds to the outer diameter of the pipe. To form a joint between two lengths of the pipe 30 the collar 31 is positioned over the ring 36 at one end of the pipe, for instance, the end 19, leaving a space 43 between the pipe face 35 and the adjacent end of the collar. When the collar 31 is thus positioned on the pipe a space is left between the collar band 41 and the pipe cylinder 32 in which a caulking material 44 such as lead wool is positioned. The caulking 44 is tightly driven against the pipe ring 36 and extends to approximately flush with the adjacent end of the pipe cylinder 32.

After the collar 31 has thus been positioned on one pipe length the end 38 of another length of pipe 30 is positioned in the collar leaving a space 45 between the face 35 of the second pipe and the adjacent end of the collar. When the second pipe has been positioned in the collar a chamber 46 is left between the adjacent ends of the two pipes and a space is left between the collar band 40 and the cylinder 32 of the second pipe. In this space I place caulking material 47 such as lead wool. The caulking 47 like the caulking 44 is tightly driven against the ring 36 of the second pipe and extends to approximately flush with the end 38 of its associated pipe.

After the caulking material 47 has been placed in position a fill material 48 such as cement mortar is positioned in the chamber 46 and a similar fill material 49 is positioned in the spaces 43 and 45.

The construction of the pipes and collar shown in Fig. 6 may be reversed to form an inside joint instead of an outside joint as previously described in connection with the reversed structure of Fig. 3, as shown in Fig. 5.

In Fig. 7 I have indicated another modified form of cement pipe construction generally at 50. As shown the pipe 50 comprises a metal reinforcing cylinder 51 embedded between an outer layer of concrete 52 and an inner layer of concrete 53. At one end the inner layer of concrete 53 terminates in a plane face flush with the end of the cylinder 52 as at 54 and at the opposite end both the end of the cylinder and the concrete are beveled as at 55. Adjacent the end of the pipe 54 I provide an annular triangularly shaped metal ring 56 and adjacent the end of the pipe 55 a similarly shaped metal ring 57. Both the rings 56 and 57 surround the cylinder 51 a distance inward from the adjacent ends of the cylinder and are secured thereto by spot welding as indicated at 58. Spaced from and surrounding the end portion of the cylinder at the pipe end 54 I provide a metal band 59 the inner surface of which engages the outer surface of the ring 56.

The ring 59 extends outward beyond the adjacent end of the cylinder and is flared outwardly as indicated at 60. The outer layer of concrete 52 overlays the band 59 and terminates flush with the outer end thereof as at 61 while at the opposite end it terminates in a beveled face 62 positioned inward from the ring 57. Embedded in the outer layer of concrete 52 I preferably provide a metal reinforcing cage 63 which at one end is secured as at 64 to the band 59 as by welding and at the opposite end terminates inward from the end 62.

Positioned in the space between the cylinder 52 and the band 59 I provide a caulking material 65 such as lead wool. The caulking 65 is tightly driven against the ring 56 and extends to approximately flush with the adjacent end of the cylinder.

When joining two lengths of pipe 50 the end 55 of one pipe is arranged within the band 59 of the other pipe at a position wherein a chamber 66 is left between the adjacent ends of the two lengths of pipe. In this position the inner surface of the band 59 of the first pipe engages the outer surface of the ring 57 and extends therebeyond a short distance leaving a space 67 between the end 61 of the first pipe and the end 62 of the second pipe. A caulking material 68 such as lead wool is then positioned in the space between the band 59 of the first pipe and the cylinder 52 of the second pipe.

The caulking 68 is tightly driven against the ring 57 of the second pipe and extends to approximately flush with the adjacent end of the second pipe cylinder. After the caulking 68 has been placed in position a filling material 69 such as cement mortar is positioned in the chamber 66 and a similar filling material 70 is positioned in the space 67.

In Fig. 8 I have indicated a further modified form of cement pipe construction generally at 71. As shown the pipe 71 comprises a metal reinforcing cylinder 72 embedded between layers of concrete 73 and 74. At one end the inner layer of concrete 73 terminates in a plane face 75 flush with the adjacent end of the cylinder 72 while at the opposite end both the end of the cylinder and the concrete are beveled as at 76.

Adjacent the end 75 of the pipe I provide a metal bell ring 77 which surrounds a portion of the cylinder 72 and is spaced therefrom. The outer end of the bell ring 77 extends outward beyond the adjacent end of the cylinder where it is flared outwardly as indicated at 78. The inner end of the bell ring 77 extends inward from the adjacent end of the cylinder and includes an inwardly beveled portion 79 which engages the cylinder 72 and is secured thereto as by spot welding as indicated at 80. Adjacent the pipe end 76 I provide a triangularly shaped metal ring 81 which surrounds the cylinder 72 a distance inward from the adjacent end thereof and is secured to the cylinder by spot welding as indicated at 82. The outer layer of concrete 73 overlays the bell ring 77 and terminates flush with the end thereof as at 83 while at the opposite end it terminates in a beveled face 84 positioned inward from the ring 81.

Positioned in the space between the bell ring 77 and the cylinder 72 I provide a caulking material 85 such as lead wool. The caulking 85 is tightly driven against the beveled portion 79 of the bell ring and extends to approximately flush with the adjacent end of the cylinder. When joining two lengths of pipe 50 the end 76 of one pipe is arranged within the bell ring 77 of the other pipe at a position wherein a chamber 86 is left between the adjacent end of pipe sections.

In this position the inner surface of the bell ring 77 of the first pipe engages the outer surface of the ring 81 of the second pipe and extends therebeyond a short distance leaving a space 87 between the end 83 of the first pipe and the end 84 of the second pipe. A caulking material 88 such as lead wool is then positioned in the space between the bell ring 77 of the first pipe and the cylinder 72 of the second pipe. This caulking 88 is tightly driven against the ring 81 of the second pipe and extends to approximately flush with the adjacent end of the cylinder 72 thereof. After the caulking 88 has been placed in position a filling material 89 such as cement mortar is positioned in the chamber 86 and a similar filling material 90 is positioned in the space 87.

In Fig. 9 I have indicated another modified form of cement pipe construction generally at 91. As shown the pipe 91 comprises a metal reinforcing cylinder 92 which is embedded between an outer layer of concrete 93 and an inner layer of concrete 94. At one end the inner layer of concrete 74 terminates in a plane face 95 flush with the adjacent end of the cylinder 91 while at the opposite end both the end of the cylinder and the concrete are beveled as indicated at 96.

At the end 95 of the pipe the outer layer of concrete 93 is set back from the adjacent end of the cylinder and is beveled as at 97. Extending outwardly from the beveled face 97 adjacent the cylinder 91 I provide a reduced flange portion 98 formed integral with the concrete 94. At the opposite end of the pipe the outer layer of concrete 94 is set back from the adjacent end of the cylinder and terminates in a beveled face 99.

In forming a joint between two lengths of pipe 91 a collar member indicated generally at 100 is employed. As shown the collar member 100 comprises a metal band 101 having a ring of concrete 102 thereon. The opposite end portions of the collar band 101 are curved inwardly as indicated at 103 and the concrete 102 terminates flush with the ends of the band and are beveled outwardly as at 104. The inner diameter of the intermediate portion of the collar band 101 is of greater diameter than the outside diameter of the pipe cylinder 91 while the innermost diameter of the curved portions 103 of the collar band are approximately the same as the outer diameter of the pipe flange 98. The outside diameter of the collar 100 is preferably the same as the outside diameter of the pipe.

The collar 100 is positioned over the end 95 of one length of pipe with one of its end faces 104 abutting the face 97 of the pipe. A caulking material 105 such as lead wool is then positioned in the space between the pipe cylinder 91 and the collar band 103. The caulking 108 is tightly driven against the pipe flange 98 and the adjacent curved end of the collar band and extends approximately flush with the adjacent end of the cylinder 91.

When joining two lengths of pipe 91 the end 96 of one pipe is arranged within the collar 100 at a location wherein the end 99 of the second pipe abuts the end 104 of the collar 100. In this position a chamber 109 is left between the adjacent ends of the pipe sections. A caulking material 110 such as lead wool is then positioned in the space between the collar band 101 and the cylinder 91 of the second pipe. The caulking 110 is tightly driven against the end face 99 of the second pipe and extends to approximately flush with the adjacent end of the cylinder of the second pipe. After the caulking material 110 is placed in position a filling material such as cement mortar is positioned in the chamber 109.

In Fig. 10 I have indicated a still further modified form of cement pipe construction generally at 112. As shown the pipe 112 comprises a metal reinforcing cylinder 113 embedded between an outer layer of concrete 114 and an inner layer of concrete 115. At each end the cylinder 113 is flared outwardly as indicated at 116. The inner layer of concrete 115 at one end terminates in a plane face 117 flush with the adjacent end of the cylinder 113 and at the opposite end terminates flush with the adjacent end of the cylinder and is beveled inwardly as at 118. At the end 117 of the pipe the outer layer of concrete 114 is set back from the adjacent end of the cylinder 113 and is beveled as at 119.

Extending outwardly from the beveled face 119 adjacent the cylinder 117 I provide a reduced flange portion 120 formed integral with the concrete 114. At the opposite end the outer layer of concrete is set back from the adjacent end of the cylinder and terminates in a beveled face 121.

In forming a joint between two lengths of pipe 112 a collar member 122 is employed. This collar is similar to the collar 100 shown in Fig. 9 and comprises a metal band 123 having a ring of concrete 124 thereon. The opposite end portions of the collar band 123 are curved inward as indicated at 125, and the concrete 124 terminates flush with the ends of the band and are beveled outwardly as at 126. The inner diameter of the intermediate portion of the collar band 123 is of greater diameter than the outside diameter of the pipe cylinder 113 while the innermost diameter of the curved portion 125 of the collar band is approximately the same diameter as the outside diameter of the pipe flange 120. The outside diameter of the collar 122 is preferably the same as the outside diameter of the pipe.

The collar 122 is positioned over the end 117 of one length of pipe with one of its end faces 126 abutting the faces 119 of the pipe. A caulking material 127 is positioned in the space between the pipe cylinder 113 and the collar band 123. The caulking extends from the face 119 of the pipe to the outwardly flared end 116 of the pipe cylinder. When joining two lengths of pipe 112 the end 118 of one pipe is positioned within the collar 122 to a position wherein the end 119 of the second pipe abuts the end 126 of the collar. In this position a chamber 128 is left between the adjacent ends of the pipe. A caulking material 129 is positioned in the space between the collar band 123 and the cylinder 113 of the second pipe which extends from the face 121 of the second pipe to the outwardly flared end 116 thereof. The caulking materials 127 and 129 are preferably made of a resilient material such as a rubber composition. After the caulking materials 127 and 129 are placed in position a filling material 130 such as cement mortar is positioned in the chamber 128.

When the pipe line comprising a plurality of sections of the pipe 112 contracts the caulking materials 127 and 129 are compressed between the ends 116 of the pipe cylinders and the curved end portions 125 of the collar bands.

From the foregoing description it will be apparent that I have provided a novel concrete pipe construction and joint therefor which is simple in construction and highly efficient in use.

Having thus described my invention, I claim:

1. A conduit comprising a plurality of lengths of concrete pipe each having a metal reinforcing cylinder embedded therein which includes end portions, said lengths being laid end to end with a chamber therebetween, an annular metal band on the end portions of said cylinders and spaced from the adjacent ends thereof, said bands being triangular in cross section with the bases thereof engaging said cylinders and secured thereto, collar members each of said collars including a metal band having a ring of concrete thereon, said collar members surrounding the adjacent projecting portions of said pipe cylinders and arranged over said pipe bands, caulking material positioned in the spaces between said pipe cylinders and said collar bands, said caulking material extending from said pipe bands to the adjacent ends of said cylinder and filling material positioned in said chambers between the adjacent ends of said pipe.

2. A conduit comprising a plurality of lengths of concrete pipes laid end to end, each of said lengths including a metal reinforcing cylinder embedded between an outer and an inner layer of concrete, an annular metal band positioned on said cylinder adjacent each end thereof, said bands being spaced inward from the adjacent ends of said cylinder, a metal bell ring adjacent one end of said lengths, said bell ring surrounding the adjacent band and extending outward beyond the adjacent end of said cylinder, the outer end of said bell ring being flared outwardly, said lengths being positioned with the bell ring of one length surrounding the end of the other length with a chamber between the adjacent ends of said inner layers of concrete of said lengths and a chamber between the adjacent ends of said outer layers of concrete, said bell ring being positioned over said pipe band of the other length, a caulking material positioned in the space between said bell and its associated cylinder, said caulking extending from said triangular band to the adjacent end of said cylinder, a second caulking material, said second caulking material being positioned in the space between said bell ring and said cylinder of the other of said lengths, said second caulking extending from the triangular band of said other length to the adjacent end of said pipe cylinder, a filling material positioned in said chamber between the adjacent ends of said inner layers of concrete and a filling material positioned in said chamber between the adjacent ends of said outer layers of concrete.

3. A conduit comprising a plurality of lengths of pipes each of said lengths including a metal reinforcing cylinder embedded between an outer and an inner layer of concrete, said inner layer of concrete at one end terminating flush with the adjacent end of said cylinder and the opposite end of said inner layer of concrete together with the adjacent end of said cylinder being beveled inwardly, an annular metal band positioned on the cylinders adjacent each end thereof, said bands being spaced inward from the adjacent ends of said cylinder, said bands being triangular in shape with their bases engaging said cylinder and secured to said cylinder, said outer layer of concrete at each end terminating in a beveled face intersecting the inner inward faces of said bands, said lengths being positioned with the plane end face of the inner layer of concrete of one length adjacent the beveled face of the inner layer of concrete of the other length with a chamber between the adjacent ends of said lengths, a collar member, said collar member including a metal band having a ring of concrete thereon, said collar surrounding the adjacent ends of said lengths with said collar band positioned over said triangular pipe bands, the opposed faces of said collar engaging the adjacent faces of the outer layers of concrete of said length, a caulking material positioned in the space between the collar band and the cylinder of one of said lengths, the caulking extending from said triangular band to the adjacent end of the cylinder, a second caulking material, said second caulking material being positioned in the space between said collar band and said cylinder of the other of said lengths, said second caulking extending from the triangular band of said other length to the adjacent end of said pipe cylinder, and a filling material positioned in said chamber between the adjacent ends of the lengths.

4. A conduit comprising a plurality of lengths of concrete pipes laid end to end, each of said lengths including a metal reinforcing cylinder embedded between an outer and an inner layer of concrete, said inner layer of concrete at one end terminating flush with the adjacent end of said cylinder and the opposite end of said inner layer of concrete together with the adjacent end of said cylinder being beveled inwardly, an annular metal band positioned on said cylinder adjacent each end thereof, said lengths being positioned with the plane end face of the inner layer of concrete of one length adjacent the beveled face of the inner layer of concrete of the other length with a chamber between the adjacent ends of said lengths, a collar member, said collar member including a metal band having a ring of concrete thereon, the opposite ends of said collar band being curved outwardly, said collar surrounding the adjacent ends of said lengths with said collar band positioned over said triangular pipe bands, the opposed faces of said collar being spaced from the adjacent end faces of said outer layers of concrete of said lengths to form chambers therebetween, a caulking material positioned in the space between said collar band and said cylinder on one of said lengths, said caulking extending from said triangular band to the adjacent end of said cylinder, a second caulking material, said second caulking material being positioned in the space between said collar band and said cylinder of the other of said lengths, said second caulking extending from the triangular band of said other length to the adjacent end of said pipe cylinder, and a filling material positioned in said chamber between the adjacent ends of said inner layers of concrete of said lengths and filling material positioned in said chambers between the ends of faces of said collar and the adjacent ends of said outer layers of concrete.

5. A conduit comprising a plurality of length of concrete pipe including a metal reinforcing cylinder embedded between an outer layer of concrete and an inner layer of concrete, said inner layer of concrete at one end terminating flush with the adjacent end of said cylinder and the opposite end of said inner layer of concrete together with the adjacent end of said cylinder being beveled inwardly, an annular metal band secured to said cylinder adjacent each end thereof, said bands being spaced inward from the adjacent ends of said cylinder, a metal bell ring adjacent one end of said length, said bell ring overlaying the adjacent band and extending outward beyond the adjacent end of said cylinder, the outer end of said bell ring being flared outwardly, said outer layer of concrete at one end terminating in a beveled face set inwardly from the inward face of said band, said outer layer of concrete at the opposite end overlaying said bell ring and terminating flush with the outer end thereof, a metal reinforcing cage embedded in said outer layer of concrete, said cage at one end being secured to said bell ring and at the opposite end terminating short of the end face of said concrete, said lengths being positioned with the bell ring of one length surrounding the plane end of the other length with a chamber between the adjacent ends of said inner layers of concrete of said lengths, and a chamber between the adjacent ends of said outer layers of concrete, said bell ring being positioned over said triangular pipe band of the other and a caulking material positioned in the space between said bell and its associated cylinder, said caulking extending from said band to the adjacent end of said cylinder.

6. A conduit comprising a plurality of lengths of concrete pipes laid end to end, each of said lengths including a metal reinforcing cylinder embedded between an outer layer and an inner layer of concrete, said inner layer of concrete at one end terminating flush with the adjacent end of said cylinder and the opposite end of said inner layer of concrete together with the adjacent end of said cylinder being beveled inwardly, an annular metal band positioned on said cylinder adjacent each end thereof, said bands being spaced inward from the adjacent ends of said cylinder, said bands being triangular in shape with their bases engaging said cylinder, a metal bell ring adjacent one end of said length, said bell ring surrounding the adjacent band and extending outward beyond the adjacent end of said cylinder, the outer end of said bell ring being flared outwardly, said outer layer of concrete at one end terminating in a beveled face set inwardly from the inward face of said band, said lengths being positioned with the bell ring of one length surrounding the plane end of the other length with a chamber between the adjacent ends of said inner layers of concrete of said lengths, and a chamber between the adjacent ends of said outer layers of concrete, said bell ring being positioned over said triangular pipe band of the other length, a caulking material positioned in the space between said bell and its associated cylinder, said caulking extending from said triangular band to the adjacent end of said cylinder and a second caulking material, said second caulking material being positioned in the space between said bell ring and said cylinder of the other of said lengths, said second caulking extending from the triangular band of said other length to the adjacent end of said pipe cylinder.

BOZIDAR J. UKROPINA.